March 12, 1957

E. W. CURTIS ET AL

2,784,683

DOUGH HANDLING MACHINE

Filed March 13, 1952

INVENTORS:
EARL W. CURTIS
JUNIOR E. CURTIS
BY THEIR ATTORNEYS
Howson &
Howson

United States Patent Office 2,784,683
Patented Mar. 12, 1957

2,784,683

DOUGH HANDLING MACHINE

Earl W. Curtis and Junior Earl Curtis, Temple, Pa., assignors to Laureldale Engineering Company, Reading, Pa., a corporation of Pennsylvania Application March 13, 1952, Serial No. 276,248

17 Claims. (Cl. 107—4)

This invention relates to automatic dough handling and shaping apparatus, and more particularly to a machine for forming rolls of dough of the type from which pretzels or pretzel "rods" are baked.

It is generally accepted in the pretzel baking industry that a kneaded roll or pretzel "snake" is more acceptable than one that is stamped. Heretofore, the "snakes," which are bars of unbaked mixed dough, have been formed between conveyor belts moving in opposite directions at differential belt speeds. After the bars of dough were rolled on the belts, they were delivered to a horizontal conveyor either as straight pieces of cylindrical dough or they could be twisted mechanically or manually into the familiar pretzel shape.

Due to the nature of the material fed between the conveyors, it is essential that the automatic machines be disassembled periodically for cleaning, and should the machines be shut down for any length of time, it was necessary to disassemble them in order to remove any dough which had not been completely fed through. The nature of the conventional devices rendered this disassembly and cleaning operation extremely time consuming and cumbersome, particularly when it is realized that a single battery of these machines contains as many as 16 individual units. Another disadvantage of the conveyor belts resided in the fact that the dough was heated during its progress through the belts, and it is important to maintain the temperature of the dough and "snakes" at a lower predetermined uniform point during the rolling operation.

The present invention eliminates the conveyor belts in a machine of this sort and substitutes a pair of metal drums, which can be controlled to keep the dough temperature within a desired uniform range. Furthermore, the drums are readily reversible so that any excess dough remaining in the machine after baking is to be discontinued can be quickly and efficiently removed. In addition, the present invention embodies an improved automatic distributor which is used with a rack that rides on the top of the conveyor, with the result that the dough "snakes" are uniformly deposited in compact rows end to end on the conveyor.

The primary object of the invention, therefore, is to provide a dough rolling machine in which mixed dough is fed between a pair of metal drums and thence rolled into a sheet of predetermined dimensions preparatory to baking.

A further object of the invention is to provide in a dough handling machine a pair of metal dough sheet forming drums and means for cutting and rolling bars of unbaked dough contiguous to and underneath the drums.

A further object of the invention is to provide in a dough handling machine a pair of metal dough sheet forming drums, a first pair of driven sheet guiding rolls below the nip of said drums and a plurality of bar forming rolls for receiving cut strips of dough and kneading the strips into bars of predetermined diameter.

A further object of the invention is to provide, in an automatic dough handling machine, a pair of metal dough sheet forming drums, a cutter for severing strips of dough from the sheet after passing through the nip of the drums and a cam actuated distributor head for depositing rolled bars of dough in predetermined sequence onto a conveyor.

A further object of the invention is to provide an improved straightening rack and guide into which rolled bars of dough may be deposited on the surface of a dough baking conveyor belt.

A further object of the invention is to provide an improved variable drive for the dough sheet forming drums, the cutter, and the distributor head of a dough rolling machine.

Further objects will be apparent from the specification and drawings in which.

The invention comprises essentially the provision of a pair of indented metal feed drums which are fed from the top through a removable hopper in which a batch of mixed dough is placed. A pair of driven guide rolls positioned under the nip of the drums receives the dough sheet thus formed and guides it to a position where an intermittently actuated cutter severs strips of dough from the sheet. These substantially rectangular strips then fall between a pair of fixed kneading rollers and a third pivoting roller timed with the cutter to receive each strip when the pivoting roller is moved away from the fixed rollers. As the pivoting roller moves back towards the fixed rollers, the strip is kneaded between the three rollers until it is of the desired diameter and length. The pivoting roller then moves outwardly again; whereupon the cylindrical bar of dough drops away from the rollers into a trough and the following strip simultaneously falls between the rollers. The timing and relative position of the rollers is arranged so that the succeeding strip cannot fall completely through the rollers before the pivoting roll has closed into kneading position. The trough into which the bar is deposited from the rollers has a pivoting side which upon proper actuation of a distributor head, drops to allow the bar to roll through the distributor head.

In the event that pretzel rods are to be baked, a special tray or rack is carried below the distributor head on a conveyor. This rack has a plurality of spaced slats between which the bars are deposited in timed relation. Since the bars may become somewhat irregular in shape during their passage into the rack, the slats are wide enough apart to receive such irregular bars and the trailing end of the rack is somewhat offset so that the dough bars are guided into and under a plurality of grooved rollers which serve to align the dough bars on the conveyor and to straighten them out.

A motor mounted on the framework drives the drums, the guide rolls, the cutter, the kneading rollers and the distributor head through suitably timed driving connections. Adjustment is achieved by means of variable speed pulleys interposed in the respective driving trains.

In practice, we mount a battery of the improved dough handling machines in staggered relation over a relatively wide conveyor belt because it is impractical to design a single distributor so that it could deposit dough bars over a belt approximately 4 feet wide.

The present dough handling machine is shown and described in conjunction with a distributor and rack for depositing dough bars on the conveyor belt. These bars are subsequently salted and baked into pretzel rods or sticks. However, it will be understood that the rack and distributor are in effect attachments that can be modified or removed so that other accessories such as a pretzel twister or a cutter can be used with the present drum and dough bar rolling mechanism.

The term pretzel rod or stick will be used to refer to the baked product such as is commonly offered for sale. A stick or pretzel snake refers to a kneaded rolled bar of dough which in a cylindrical straight form is baked into a rod or stick, or which may be twisted into the conventional pretzel shape.

Referring now more particularly to the drawings, the preferred embodiment of our invention comprises an upper horizontal frame assembly 40, which forms a platform supported by vertical frame members 44, 45, 46 and 47 mounted on lower horizontal frame assembly 48. The entire frame and its associated structure is supported above a movable conveyor belt 49 on the two side members 50 and 51 of the lower frame assembly. These side members 50, 51 extend transversely across the conveyor 49 and are supported by brackets 52, 53.

The belt 49 rides on a platform 54 and is actuated by suitable driving connections (not shown).

A pair of dough sheet forming drums 55 and 56, mounted on shafts 57 and 58 respectively, are journaled in bearing blocks 59, 60, 61 and 62 secured to upper horizontal frame assembly 40. The drum shafts 57 and 58 extend through bearings 61 and 62 and are provided with worm wheels 64 and 65 respectively which mesh with worms 66 and 67 on drum drive shaft 68. Shaft 68 extends from front to back on the machine and is provided with a hand wheel 70 at the front, and a bevelled gear 71 at the back. The shaft is journaled in bearing blocks 72, 73 and 74. Blocks 72 and 73 are mounted on upper horizontal frame assembly 40 through brackets 40a, 40a. Bearing block 74 is supported on a plate 75 which is in turn mounted on the frame assembly 40 through brackets 40b, 40b.

The direction of rotation of drums 55 and 56 is conveniently controlled from the front of the machine by a more or less conventional reversing gear. This reversal is accomplished by pivoting a reversing lever 76 which moves a control rod 77 to selectively position a sliding collar 78 (Fig. 4) on shaft 79 through a bell crank 80. Bevel gear 71 is in constant mesh with a pair of bevel pinion gears 81 and 82 rotatably journaled on shaft 79. Each pinion gear is provided with suitable teeth for selective driving engagement with opposite ends of an internal sleeve rotatably mounted for reciprocation with collar 78 but splined to shaft 79 so that when shaft 79 is driven through spur gear 83, gear 71 may be selectively driven in either direction, depending upon the position of lever 76. Shaft 79 is suitably journaled in bearing blocks 84 and 85 mounted on plate 75.

Spur gear 83 meshes with a pinion gear 88 keyed to countershaft 89 journaled in bearings 90, 90 and having a pulley 91 keyed to one end thereof. Driving connections between pulley 91 and the main motor 92 are achieved through belt 94 which connects the motor pulley 95 to pulley 96 on shaft 97. This shaft is in turn connected to pulley 91 through belt 98 and a variable speed pulley 99. It will be understood that vertical movement of shaft 97 with respect to shaft 89 serves to change the relative speeds of the two shafts in a manner that will be described more fully hereinafter.

Shaft 97 is journaled in bearing blocks 100, 100 and carries another variable speed pulley 101 opposite pulley 99. Pulley 101 drives countershaft 102 through belt 103 and pulley 104 keyed to shaft 102. Shaft 102 is journaled in bearing blocks 105 and 106 on vertical frame members 44 and 45 respectively. It will thus be understood that either simultaneous or independent adjustment of shafts 102 and 89 may be accomplished by moving the motor either vertically or horizontally to effect a change in the distance with regard to either of the variable speed pulleys 99 and 101.

Referring now to Figs. 5–8, motor 92 is secured to a pedestal 110 which is capable of vertical movement when crank 111 is turned. Links 112 and 113 are connected to pedestal 110 at one end and to a stationary member 114 at the other end. A threaded block 115 on upper link 113 is engaged with the threaded end of the crank 111 so that when the crank is turned, the pedestal 110, is raised or lowered to provide the desired speed ratio between pulleys 91 and 99.

Adjustment of the relative speed of pulleys 101 and 104 is provided by means of crank 121 which has a shank threadedly engaged with an angle member 122 welded to the slidable plate 123. This plate is held horizontally by the angles 124, 124 (Fig. 7) and when crank 121 is turned, the entire vertical control assembly, including pedestal 110, plates 120 and 123, may be moved horizontally to effect the desired speed ratio between pulleys 101 and 104. It will thus be understood that the speed of the drums 55 and 56 can be adjusted by means of crank 111, whereas the speed of shaft 102 can be independently or simultaneously regulated through crank 121.

Figure 1:
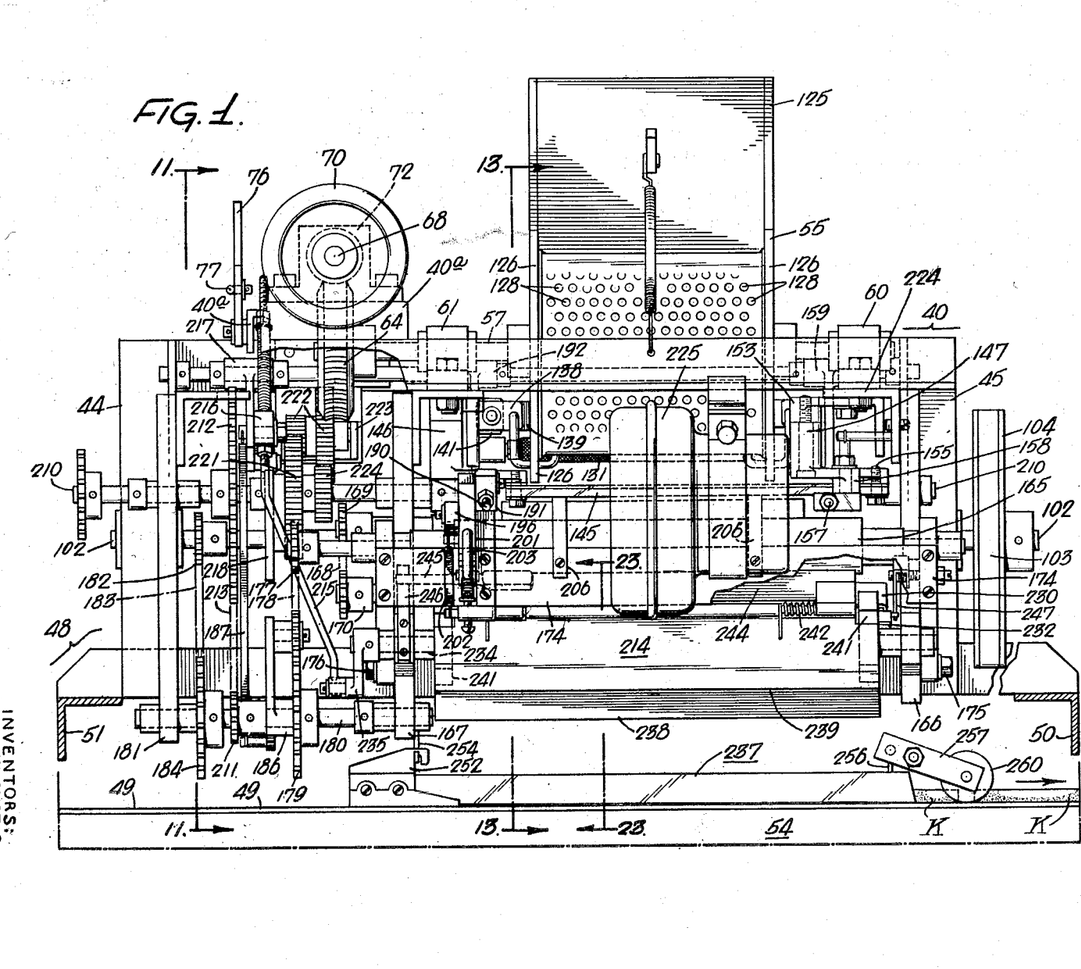
Fig. 1 is a front view of our improved dough handling machine having a pretzel rod distributor and rack.
Figure 2:
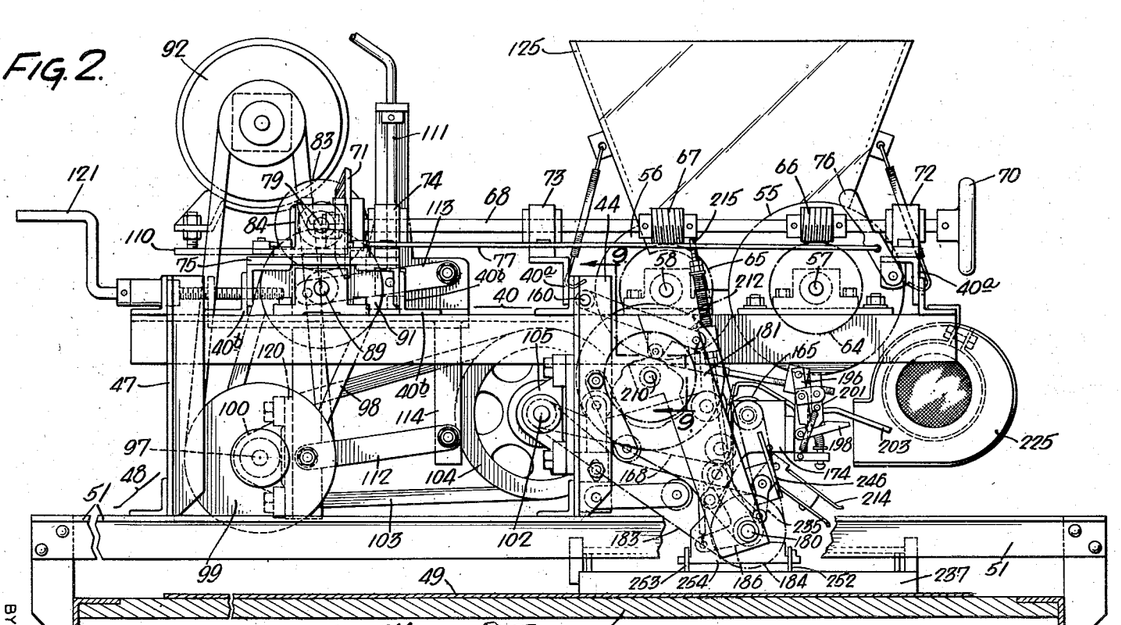
Fig. 2 is a left side view, on a reduced scale, of the structure of Fig. 1.
Figure 12:
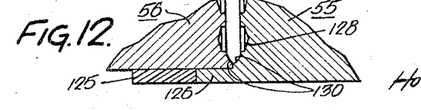
Fig. 12 is a fragmentary sectional detail as seen at 12—12 of Fig. 11.
Figures 13, 14, 15:
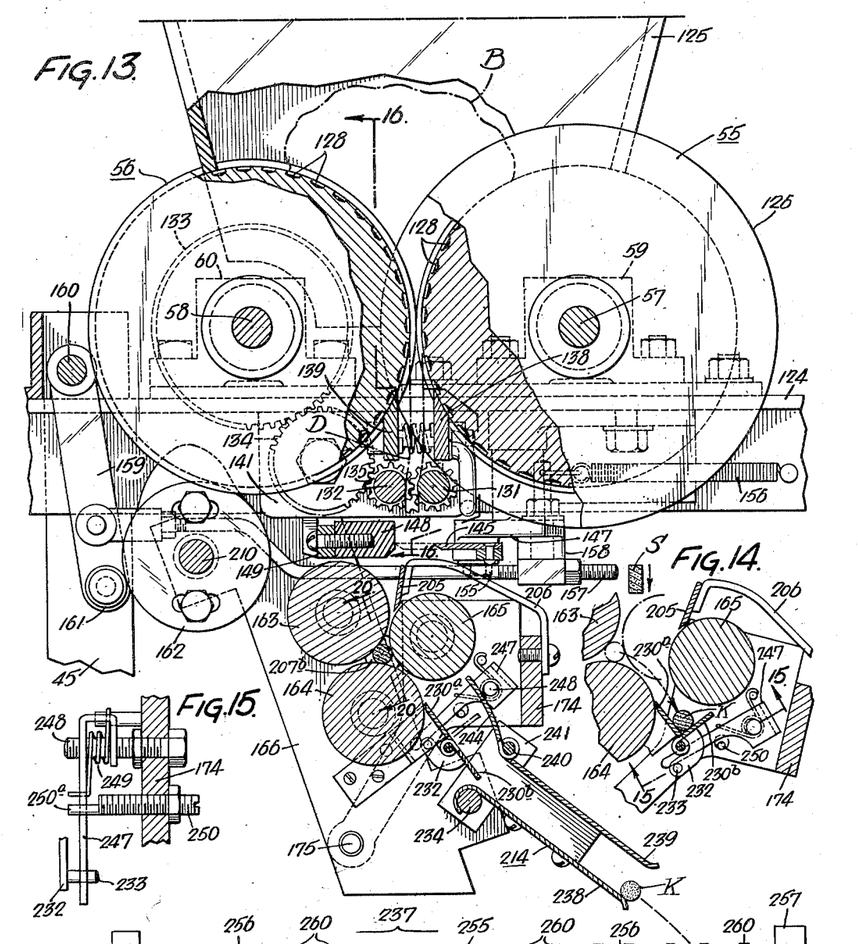
Fig. 13 is an enlarged transverse section as seen at 13—13 of Fig. 1.
Fig. 14 is a fragmentary sectional detail of a part of the structure of Fig. 13 showing one kneading roller in a moved position.
Fig. 15 is a fragmentary sectional detail as seen at 15—15 of Fig. 14.

A batch of dough B is deposited in a hopper 125 which is desirably formed of a synthetic plastic material, such as methyl methacrylate, and which rides on the periphery of the drums. Drum 55 is provided with flanges 126, 126 which closely overlap the sides of drum 56. Hopper 125 rides on the edges of flanges 126, 126 and extends downwardly around the sides of drum 56 to prevent any dough from escaping. The ends of the hopper extend downwardly to contact the periphery of each drum as shown in Figs. 1 and 13. The face of each drum is of substantially equal diameter and is provided with a plurality of small indentations 128, 128; into which the dough is pressed to insure that it is carried between the nip of the drums; also, the outer extremity of the face of each drum is slightly flared as shown at 130 in Fig. 12 to round the edges of the dough sheet. If desired, the nip of the drums 55 and 56 may be adjusted to control the thickness of the dough sheet.

Figure 16:
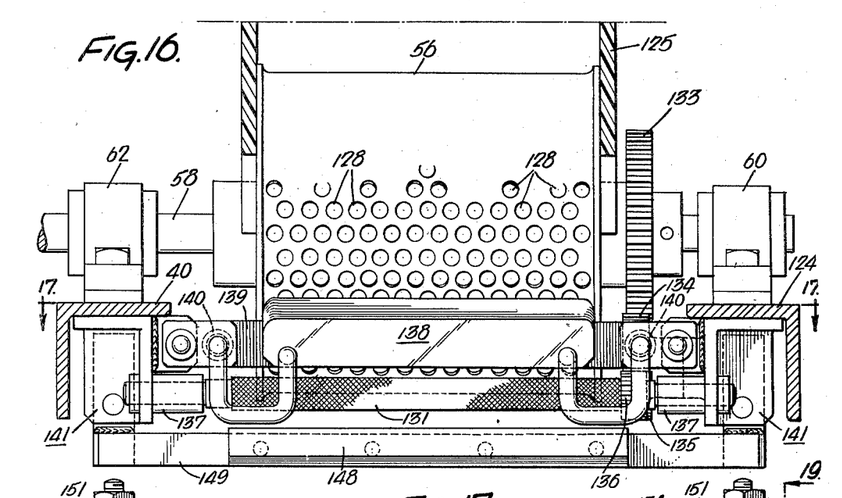
Fig. 16 is a sectional detail as seen at 16—16 of Fig. 13.
Figures 17, 18, 19:
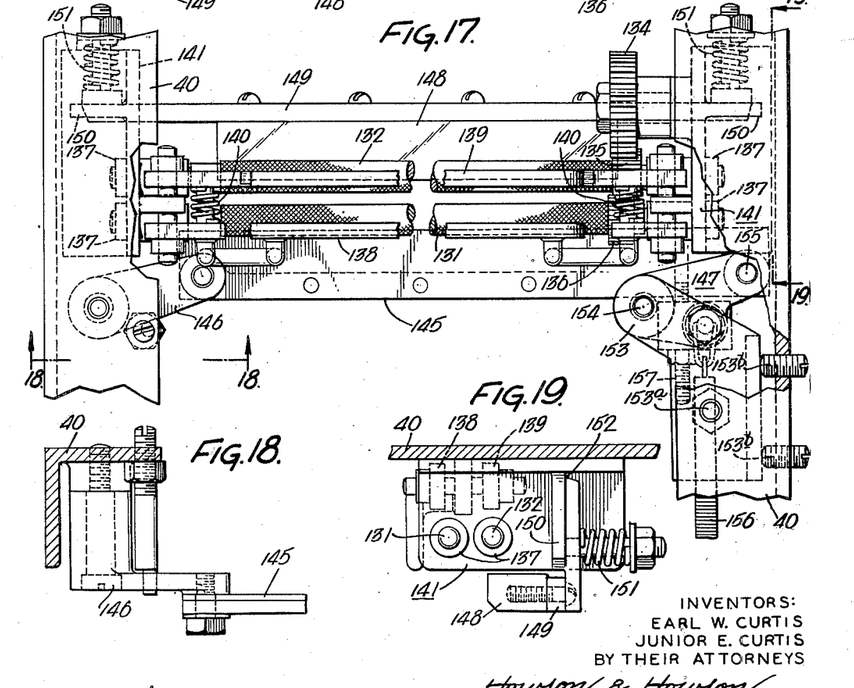
Fig. 17 is a sectional detail as seen at 17—17 of Fig. 16.
Fig. 18 is a fragmentary sectional detail as seen at 18—18 of Fig. 17.
Fig. 19 is a fragmentary sectional detail as seen at 19—19 of Fig. 17.

The sheet of dough D formed between the drums is carried to a pair of knurled guide rolls 131 and 132 (Figs. 13 and 16) which are driven from drum shaft 58 through gears 133 and 134; the latter of which meshes with a spur gear 135 on roll 132. A similar gear 136 on roll 131 meshes with gear 135 to provide equal drive for each roll. The rolls 131 and 132 are journaled in the self-aligning bushings 137, 137 as shown in Figs. 16 and 17. A pair of resiliently mounted blades 138 and 139 mounted between the nip of drums 55, 56 and rolls 131, 132 insure that if the dough sheet, when initially fed or if broken, always is directed between rolls 131 and 132. The blades 138 and 139 are spring loaded to scrape the periphery of the drums by means of compression springs 140, 140 and the blades are supported on the upper frame assembly by brackets 141, 141. Blade 138 is interrupted to provide suitable clearance for the flanges 126, 126 of drum 55 as shown in Figs. 16 and 17.

After passing through the nip of rolls 131 and 132, the dough sheet D is intermittently cut into strips S by means of a cutter 145, pivotally carried in brackets 146 and 147. The cutter 145 cooperates with a resiliently mounted backing block 148 secured to a cross member 149 as shown in Fig. 19, so that the dough strips S are severed from the sheet D when it is compressed between the cutter and the block. Member 149 is pressed against an ear 150 on each side of the frame by means of springs 151, 151 in such a way that when the block 148 is displaced by actuation of the cutter, the member 149 pivots on ear 150 at its upper extremity 152. The cutter 145 is actuated in timed relation with the feed of the dough sheet through bracket 147 pivoted to an adjustable arm 153 at 154 and to the cutter at 155. The cutter 145 can readily be adjusted by pivotal movement of the arm 153 by loosening nut 153a and pivoting the arm on frame member 40 by means of adjusting set screws 153b, 153b. A third pin 146a having an offset nose 146b controls the stop position of cutter 145. The crank member is spring loaded by means of an extension spring 156 and an actuating rod 157 is adjustably connected to the lever in a boss 158 as shown in Fig. 13. Rod 157 is controlled by movement of rocker arm 159 pivoted on stationary shaft 160 and having a cam follower 161 engageable with cam 162.

As the strips of dough S are severed from the sheet D by cutter 145, they fall downwardly between a group of driven rollers 163, 164 and 165. Rollers 163 and 164 are journaled in depending frame hangers 166 and 167; and are driven by a chain 168 passing over sprockets 169, 170 on the rollers and sprocket 171 on shaft 102. Chain 168 is provided with a suitable tightener 172, slidably mounted in a vertical bracket on lower frame assembly 48 and adjustable by means of a set screw 173. The pivoting roll 165, however, is journaled in a carriage 174 secured to frame hangers 166 and 167 at 175 and 176.

Figure 11:
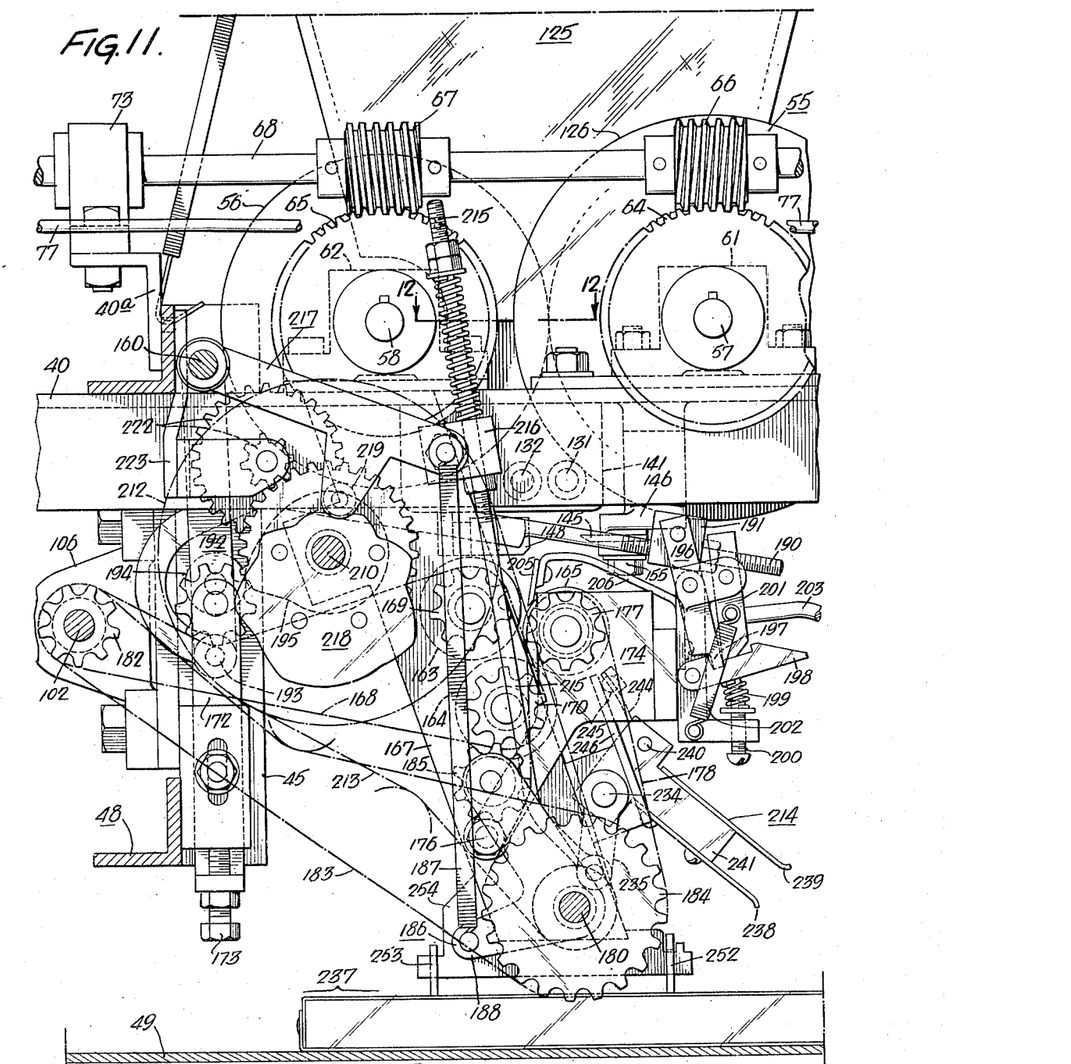
Fig. 11 is an enlarged transverse section as seen at 11—11 of Fig. 1.

Carriage 174 pivots outwardly to the position shown in Fig. 14 to permit a dough strip to fall onto the periphery of roll 164. As soon as this has occurred, the carriage 174 pivots upwardly to the position of Fig. 13, thus rolling the strips S into a bar or snake of dough K. The drive for roller 165 is provided through sprocket 177, chain 178 and sprocket 179 on shaft 180. Shaft 180 is journaled in depending frame hangers 167 and 181, and is drivingly connected to shaft 102 through sprocket 182, chain 183 and sprocket 184 on shaft 180. Since the pivoting center of carriage 174 is substantially offset (for a purpose to be described more fully hereinafter) from the center of shaft 180, a spring loaded chain tightener 185 is mounted on a bell crank 186 freely journaled on shaft 180. An extension spring 187 connected to one arm 188 of the bell crank 186 serves to maintain the desired tension in chain 178 during all pivoting positions of the carriage 174. Movement of carriage 174 and roll 165 is achieved through a rod 190 (Fig. 9 and 11), one end of which is adjustably secured in a block 191 and the other of which is pivoted to a rocker arm 192 at 193. Rocker arm 192 is journaled on shaft 160 and has a cam follower 194 actuated by cam 195.

We provide a special latch for releasing the carriage 174 so that it can be moved outwardly if desired regardless of the position of rod 190 and cam 195. This releasing latch comprises a finger 196 pivoted to block 191 and having an extension 197 engageable in a notch on trigger 198. Trigger 198, which is in turn pivoted at its inner end to carriage 174 is spring loaded upwardly by means of spring 199 adjustable at 200 and the pivoting movement of the trigger is controlled by a latch member 201 which is pivoted to a rearwardly extending branch of finger 196 and is spring loaded at 202 to retain the extension 197 in driving engagement with the trigger 198. The handle 203, however, may be raised manually to displace trigger 198 and permit the extension 197 to be released from its seat thus enabling the frame 175 to pivot forwardly. In the event that the latch is not manually reset, the tension of spring 202 provides for automatic resetting of the latch when the machine is re-started.

A guard 205 is mounted on carriage 174 by means of brackets 206, 206; the function of the guard being to insure that dough strips S severed from the sheet always fall between the three kneading rollers and not over the top of roller 165.

Figures 20, 21, 22:
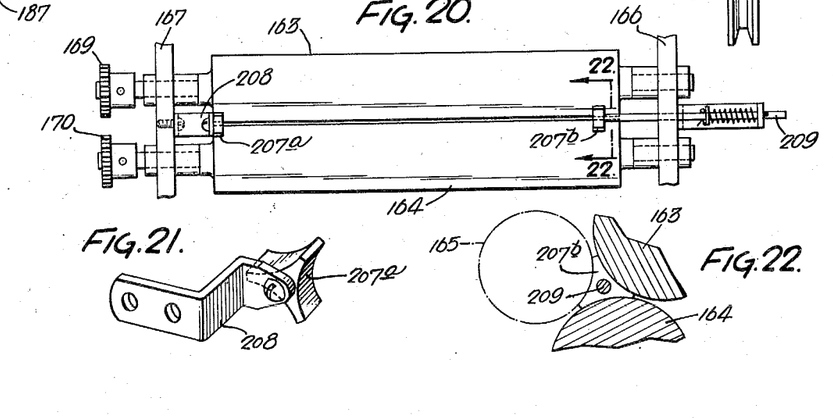
Fig. 20 is a fragmentary detail of the fixed kneading rollers as seen at 20—20 of Fig. 13.
Fig. 21 is a perspective showing one of the dams for retaining the dough bars endwise in the kneading rollers.
Fig. 22 is a fragmentary sectional detail as seen at 22—22 of Fig. 20.

In order to prevent the dough from being extruded endwise from the kneading rollers 163, 164, 165; we provide a dam at either end of the rollers. These dams 207a and 207b are trifurcated as shown in Fig. 21 and dam 207a is mounted on a bracket 208 secured to frame member 167. The opposite dam 207b is mounted on a spring loaded plunger 209 to provide a resilient control for the length of the dough bars K as shown clearly in Figs. 21 and 22. The dams are located in sliding contact with the faces of the rollers and effectively seal the space therebetween.

Figures 9, 10:
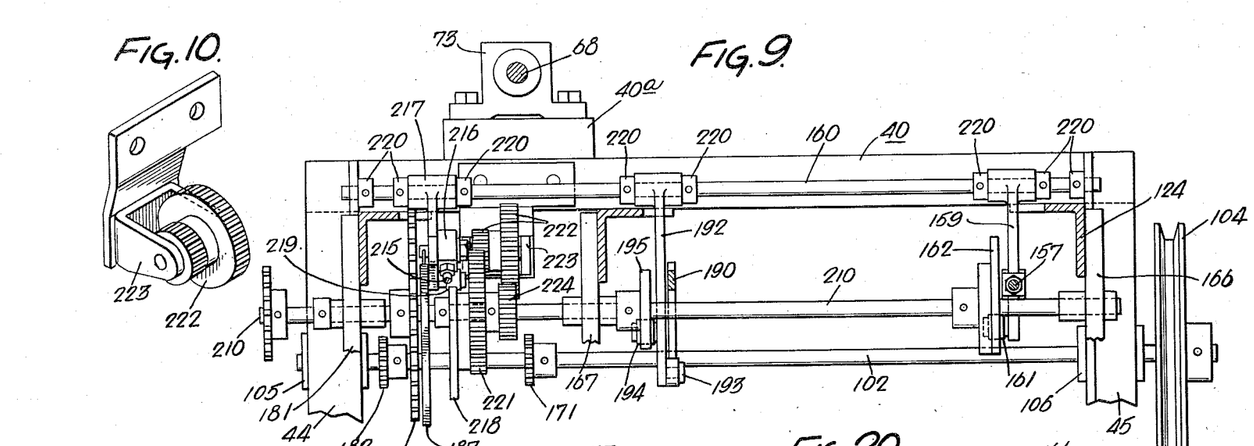
Fig. 9 is an enlarged sectional detail as seen at 9—9 of Fig. 2.
Fig. 10 is a fragmentary perspective showing a part of the structure of Fig. 9.

Referring now particularly to Fig. 9, the details of the cutter drive and the carriage drive will be more fully described. Shaft 180 (Fig. 1) drives a countershaft 210 through sprocket 211 on shaft 180, sprocket 212 on shaft 210 and chain 213. Shaft 210 is journaled in suitable bearing blocks attached to the back edges of depending frame hangers 166, 167 and 181. The right hand end of shaft 210 carries the cutter cam 162 previously described, and the shaft also carries the cam 195 which controls the pivoting movement of carriage 174.

Figures 23, 29:
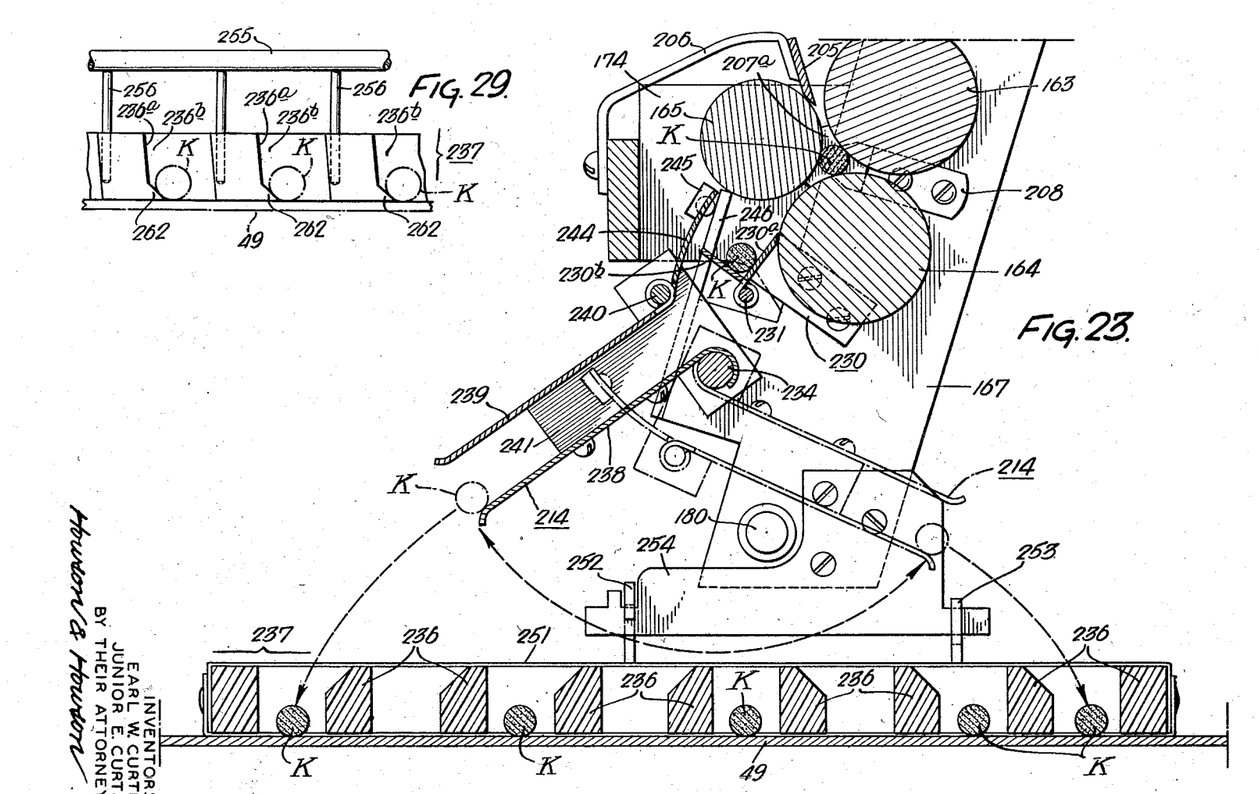
Fig. 23 is an enlarged sectional detail as seen at 23—23 of Fig. 1.
Fig. 29 is an enlarged sectional detail as seen at 29—29 of Fig. 27.

The distributor assembly 214 swings back and forth as indicated in Figs. 13 and 23 in order to distribute the dough bars K across the conveyor 49 in a manner to be more fully described. This swinging movement for the distributor 214 is timed and controlled by a rod 215 which is resiliently and adjustably mounted in a block 216 carried on rocker arm 217. A cam 218 freely journaled on shaft 210 controls the movement of rocker arm 217 through a cam follower 219. Rocker arm 217 is pivoted on shaft 160 as are rocker arms 159 and 192. The rocker arms as well as the shaft 160 are suitably retained in place by means of a plurality of collars 220, 220. Cam 218 is formed integrally with a gear 221 which in turn meshes with a compound gear 222 journaled in bracket 223 (Figure 10). Compound gear 222 is driven from shaft 210 by pinion gear 224 so that a substantial reduction in relative turns is provided between cam 218 and shaft 210. The number of rows of rods to be distributed is controlled by the relative turns of shaft 210 and cam 218. In the present machine, the ratio is 8:1.

In order to control the moisture in the dough, we mount a small blower 225 from the upper frame member 40 in such a manner that a blast of air is directed against the rollers 163, 164 and 165.

Figures 24, 25:
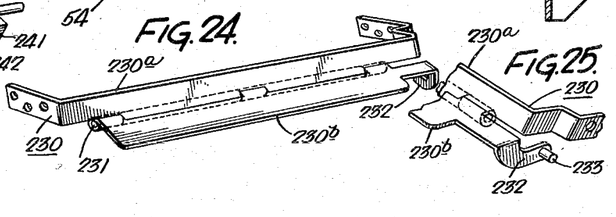
Fig. 24 is a perspective showing the pivoting trough for receiving the rolled dough rods.
Fig. 25 is a perspective of one end of the pivoting plate of Fig. 24.
Figure 26:
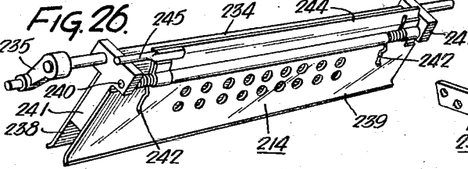
Fig. 26 is a perspective of the distributor assembly.

Referring now to Figs. 13 and 23, the kneaded bars of dough are dropped from contact with rollers 163, 164 and 165 when carriage 174 pivots outwardly. In this outward position of the carriage, the rotation of the lower roller 164 carries the bars onto a trough 230 which has a fixed or stationary side 230a secured to the depending frame hangers 166 and 167 (Fig. 24). The pivoting side 230b of the trough is hinged thereto by a pin 231 and is controlled by means of an extension 232 which carries a pin 233 (Fig. 25). At suitable timed intervals, the side 230b of the trough pivots to the position shown in Fig. 13 to dump the dough bars from the trough into the distributor 214.

The distributor comprises an elongated flat chute mounted upon a transverse bar 234 journaled in frame hangers 166 and 167. A lever 235 is pinned to one end of bar 234 and the lever is operatively connected with cam 218 through rod 215 (Figs. 1 and 9). The face of cam 218 is such that the distributor 214 is selectively positioned to direct dough bars between alternate slats 236, 236 of the rack assembly 237. Fig. 13 shows the distributor in the position to direct a dough bar between the outermost slats of the rack.

The distributor chute has a fixed side 238 which is nonrotatably mounted on bar 234. The opposite side 239 of the chute is hinged on an auxiliary bar 240 which is mounted in spacer blocks 241, 241. Sides 239 is spring loaded by means of helical springs 242, 242 and normally rests against the spacer blocks 241, 241. Side 239 is hinged so that ready access is possible to the inside of the distributor for purposes of cleaning. Bar 240 also carries a spring loaded extension 244 for side 239, the position of which is controlled by a laterally extending arm 245 secured thereto and a guide 246 against which the arm slides. Fig. 23 shows in broken lines the distributor in an extreme position in which the extension 244 is positioned to catch dough bars that are dropped from the trough 230, otherwise the bars would not fall into the distributor. As the distributor swings clockwise as seen in Fig. 23, there will be several intermediate positions in which the extension 244 is necessary to guide the bars into the distributor. However, this function becomes unimportant in the extreme position shown in full lines because the mouth of the distributor is directly underneath the trough. However, the extension 244 is pivoted slightly by the guide 246 so that it will not interfere with the movement of the pivoting side 230b of the trough.

The point in the cycle at which trough 230 is actuated to dump dough bars into the distributor 214 is controlled by the position of carriage 174. A spring loaded finger 247 pivoted to carriage 174 at 248 and urged to turn in a counterclockwise direction by means of a fly spring 249 engages the pin 233 on extension 232 (Figs. 25 and 14). When carriage 174 pivots to its open position as shown in Fig. 14, finger 247 engages the pin 233 to hold side 230b of the trough in a raised position so that the dough bars are caught in the trough and retained therein. As the carriage 174 pivots upwardly to knead the succeeding dough strip, pin 233 continues in contact with the under side of finger 247 due to the action of gravity which tends to normally keep the side 230b in the open position of Fig. 13. This continued opening or downward pivoting of the side 230b is permitted to continue uninterrupted during the movement of carriage 174, because the finger 247 comes to rest against the stop 250, thereby transferring support of the finger from pin 233 to the stop. Fig. 15 shows the manner for adjusting the point at which the trough opens or closes. Stop 250 is provided with an eccentric extension 250a which controls the limit position of the finger when the stop is turned in the carriage 174.

The action of the trough and the timing control mechanism therefore has previously been described, and in this connection, it will be understood that the pivoting center 175 for carriage 174 is so located that the roller 165 quickly separates from its kneading position with rollers 163 and 164 so that the kneaded bar is ejected instantly into the trough 230. By offsetting the pivoting center 176 for the carriage 174, the path of travel of roller 165 is such that on the return or upward part of the cycle, the clearance between the periphery of roller 165 and roller 164 will become insufficient to permit the succeeding dough strip to pass between these two rollers before it has been kneaded. The point, therefore, at which the gap between rollers 164 and 165 is less than the thickness of a dough strip is so timed in the cycle that it occurs before the dough strip falls into contact with roller 164.

Figures 3, 4, 30:
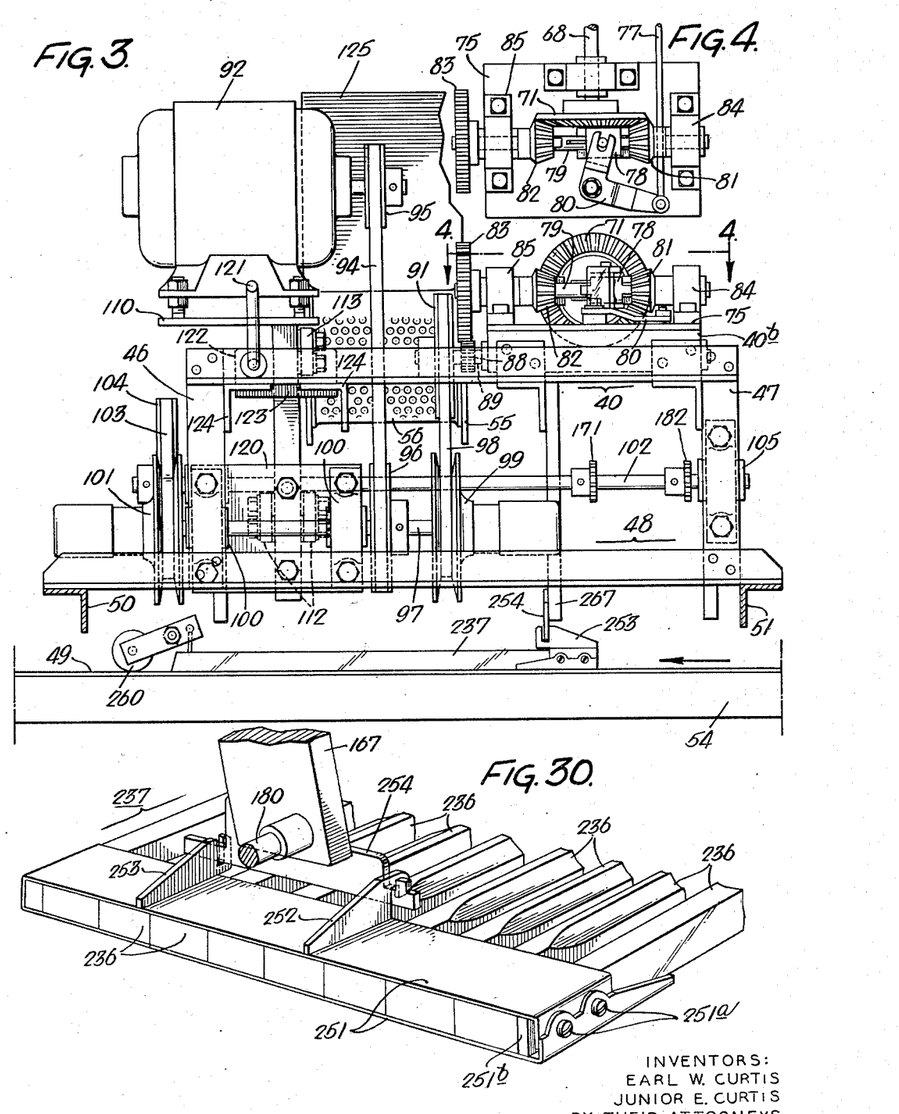
Fig. 3 is a rear view, on a reduced scale of the structure of Fig. 1.
Fig. 4 is a top view of the reversing mechanism as seen at 4—4 of Fig. 3.
Fig. 30 is a perspective showing the supporting structure for the rack.
Figures 5, 7:
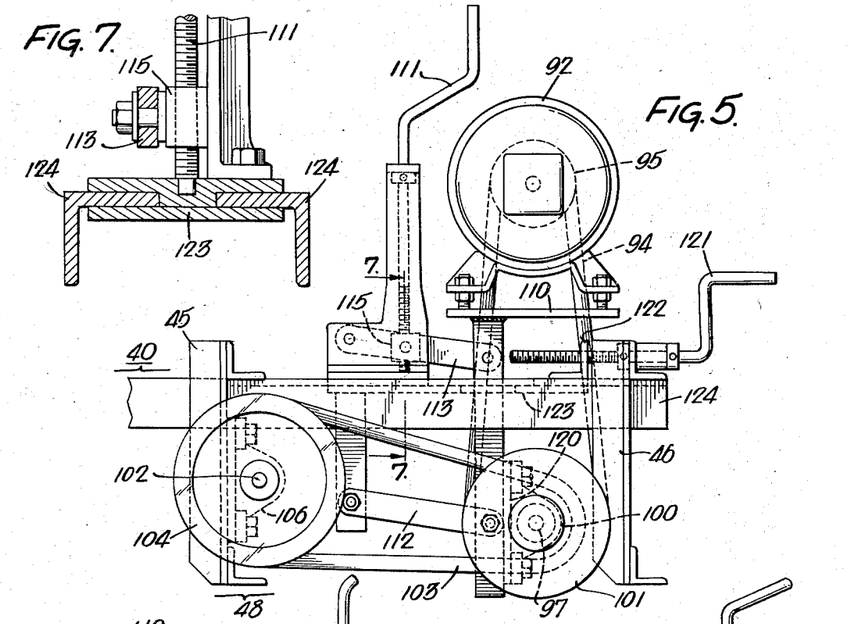
Fig. 5 is a fragmentary detail of the right side of the structure of Fig. 1 showing the variable speed drive mechanism.
Fig. 7 is an enlarged sectional detail as seen at 7—7 of Fig. 5.
Figure 6:
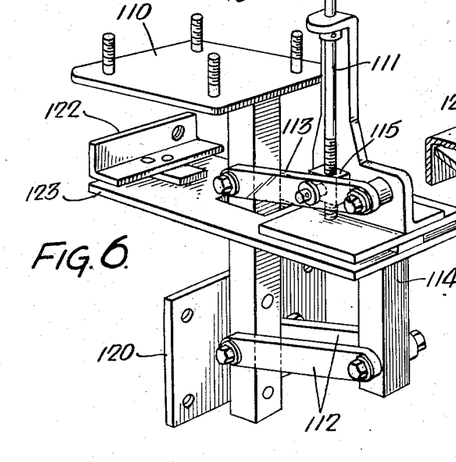
Fig. 6 is a perspective showing a part of the structure of Fig. 5.
Figure 8:
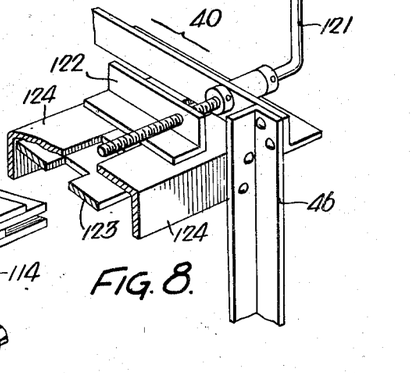
Fig. 8 is a fragmentary perspective of a part of the structure of Fig. 5.
Figures 27, 28:
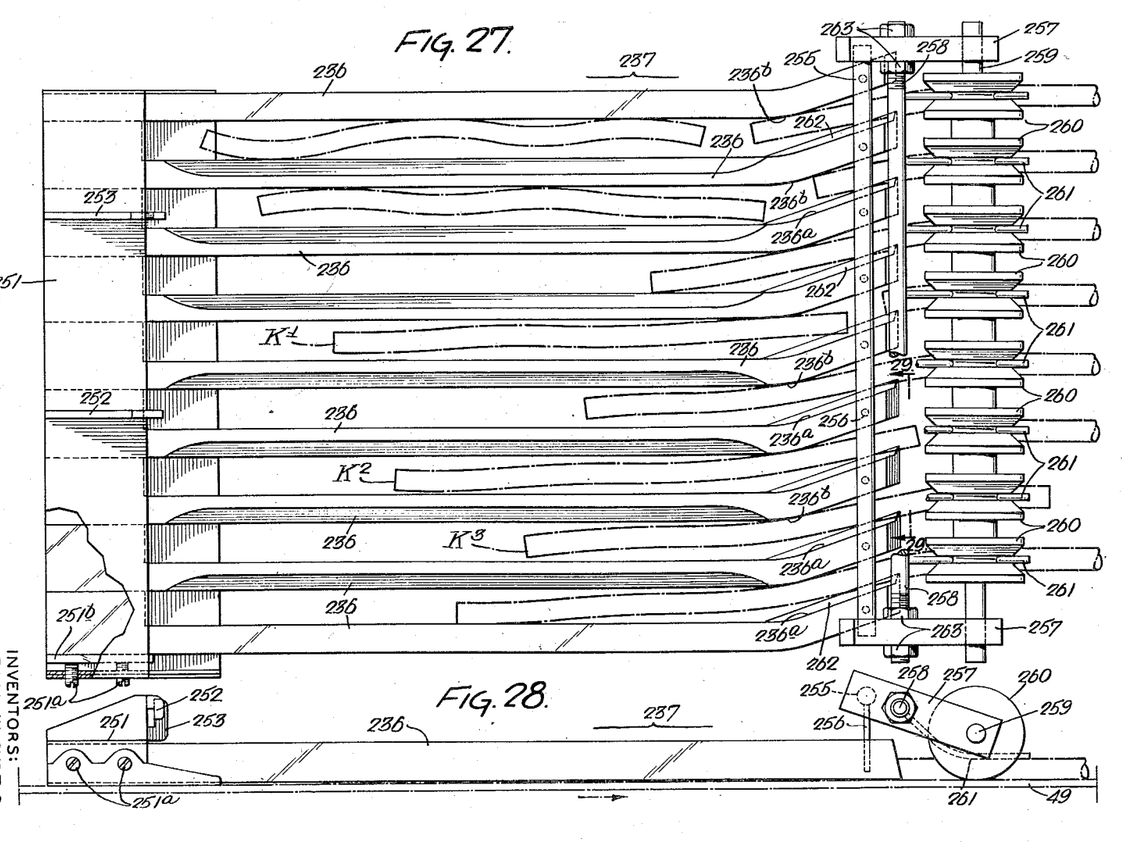
Fig. 27 is a top view of the dough bar rack.
Fig. 28 is a front view of the structure of Fig. 27.

Referring now to Figs. 23, 27 and 30, the rack 237 into which the dough bars are directed by the distributor 214 comprises a plurality of slats 236, 236 which are desirably bevelled as shown in Fig. 13 to facilitate entry of the bars therebetween. The slats are spaced wide enough apart so that any deformation in the bars caused by rolling through the distributor does not prevent their falling completely between the slats. Fig. 27 shows typical dough bars as received by the rack in which the bars are not uniformly straight. The slats 236, 236 are anchored at the leading edge of the rack in a cover 251, by means of set screws 251a, 251a which compress the slats in the cover through a pressure plate 251b. The top of the cover 251 is provided with a pair of tabs 252 and 253; the latter of which is slotted upwardly (see Fig. 30) to engage a bar 254 secured to the lower end of frame hanger 167. Tab 252 is shaped to hook over the front of bar 254. This construction permits the rack to float on top of the conveyor 49 and to be accurately aligned transversely thereof. The opposite ends of slats 236, 236 are bent or offset and are retained in spaced relation by a cross arm 255 having downwardly depending pins 256, 256 which fit in holes in the ends of the slats. Cross arm 255 also carries a pair of brackets 257, 257 which are spaced from each other by a rod 258 and support a shaft 259. A plurality of grooved straightening rollers 260, 260 are journaled on shaft 259, and the grooved centers of rollers 260 are in predetermined registry with the offset ends of the slats for a purpose to be described more fully hereinafter. Each roller 260 is also provided with a plow 261 mounted on rod 258 which prevents the dough bars K from sticking to the rollers.

As explained above, it is important that the spacing of slats 236, 236 be sufficiently far apart to insure that bent or wavy dough bars always fall between the slats onto the conveyor belt 49. However, it is also necessary that these bars be straightened on the belt before they are baked into pretzel rods. It is therefore important to provide suitable structure for guiding the bars into the straightening rollers 260, 260 accurately so that the rollers do not crush or mutilate the bars. In order to direct the bars K accurately into the grooves of rollers 260, 260 we provide a foot 262 in the offset portion 236a of each slat. As the leading ends of the bars K contact these feet 262 there is a tendency for the bars to roll so that they contact the bends 236b, 236b in the adjacent slats. This action is shown clearly by the bar K1 in Fig. 27. As the bars continue to be advanced by the conveyor the combined bending and rolling action at the offset portion of the slats tends to straighten out the bars as shown by the shape of bar K2. This straightening action assists in directing the end of the bar accurately into the rollers 260. Bar K3 illustrates the position of the bars as they are drawn from the slats by the rollers and shows how they are laterally controlled by the bends 236b, 236b and the feet 262, 262. It will be understood that lateral adjustment of the rollers 260, 260 may be made by means of the adjusting nuts 263, 263 in bar 258 to compensate for variations in the texture or stickiness of the dough bars K.

The timing of the distributor and trough is such that bars are deposited between alternate slats during a progressive swing of the distributor as shown in Fig. 23. On the return swing, the intermediate spaces between slats are filled and the speed of the conveyor is so controlled that when the bars have passed under the grooved rollers 260, 260, they are formed in accurately aligned rows of cylindrical bars in which there is a minimum predetermined end to end spacing between the bars.

It will thus be understood that we have provided an improved dough handling machine which overcomes the disadvantages of conventional machines of this type. It is easy to clean and can be readily reversed to remove the dough sheet or any part thereof. All passages for the dough are accessible for cleaning or any other purpose. The temperature of the dough is not elevated to a point considered undesirable.

For the purpose of manufacturing pretzel rods, the snakes are automatically deposited on a conveyor in straight uniform rows, but they may, if desired, be twisted into any shape before being deposited in the distributing mechanism.

Having thus described our invention,

We claim:

1. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through the nip of said drums, means for actuating the cutter in timed relation to the rate of feed of the dough sheet, a plurality of rollers contiguous to the cutter for rolling and kneading the cut strips into cylindrical bars, at least one of said rollers being mounted on a fixed axis and at least one other of said rollers being mounted for bodily movement into kneading position with respect to the fixed roller, means for moving said last named roller bodily in timed relation with the cutter, a distributor having a receiving end mounted beneath said rollers for receiving the cut strips from the rollers and means for moving said distributor pivotally about said receiving end and thereby selectively depositing the strips in predetermined laterally spaced relation.

2. In a dough machine, a pair of horizontally journaled drums having cooperating peripheries in predetermined spaced relation providing a nip through which dough may be feed to form a dough sheet, a cutter contiguous to the drums for severing strips of dough from the sheet after passing through the nip of said drums, means for actuating the cutter in timed relation to the rate of feed of the dough sheet, a plurality of rollers lying in the path of descent of the strips by gravity from the cutter for rolling and kneading the cut strips into cylindrical bars, at least one of said rollers capable of pivotal movement with respect to the other rollers, means for pivoting said last named roller in timed relation with the cutter, a distributor having a receiving end mounted beneath said rollers for receiving the cut strips from the rollers and selectively depositing the strips in predetermined spaced relation, and means for moving said distributor pivotally about said receiving end in timed relation with the movement of the pivoting roller.

3. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through the nip of said drums, means for actuating the cutter in timed relation to the rate of feed of the dough sheet, a plurality of rollers lying in the path of descent of the strips by gravity from the cutter for rolling and kneading the cut strips into cylindrical bars, at least one of said rollers capable of pivotal movement with respect to the other rollers, means for pivoting said last named roller in timed relation with the cutter, a distributor having a receiving end mounted beneath said rolls for receiving the cut strips from the rollers and selectively depositing the strips in predetermined spaced relation, means for pivoting said distributor about said receiving end into successive selected positions in timed relation with the movement of the pivoting roller, and a rack for receiving individual bars from the distributor.

4. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through the nip of said drums, means for actuating the cutter in timed relation to the rate of feed of the dough sheet, a plurality of rollers contiguous to the cutter for rolling and kneading the cut strips into cylindrical bars, at least one of said rollers capable of pivotal movement with respect to the other rollers, means for pivoting said last named roller in timed relation with the cutter, a distributor for receiving the cut strips from the rollers and selectively depositing the strips in predetermined spaced relation, means for pivoting said distributor in timed relation with the movement of the pivoting roller, a rack comprising a plurality of slats between which individual bars are deposited, an endless conveyor beneath said rack, and offset termini on said slats to straighten the bars of dough as they are fed by said endless conveyor through and from said rack after deposit through said rack upon said conveyor.

5. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through the nip of said drums, means for actuating the cutter in timed relation to the rate of feed of the dough sheet, a plurality of rollers contiguous to the cutter for rolling and kneading the cut strips into cylindrical bars, at least one of said rollers capable of pivotal movement with respect to the other rollers, means for pivoting said last named roller in timed relation with the cutter, a distributor having a receiving end mounted beneath said rollers for receiving the cut strips from the rollers and selectively depositing the strips in predetermined spaced relation, means for pivoting said distributor about said receiving end into successive selected position in timed relation with the movement of the pivoting roller, means for driving said rollers and said drums and cutter in timed relation to each other, and means for adjusting the speed of the rollers and cutter with respect to the speed of the drums.

6. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through the nip of said drums, means for actuating the cutter in timed relation to the rate of feed of the dough sheet, a plurality of rollers contiguous to the cutter for rolling and kneading the cut strips into cylindrical bars, at least one of said rollers capable of pivotal movement with respect to the other rollers, means for pivoting said last named roller in timed relation with the cutter, a distributor having a receiving end mounted beneath said rollers for receiving the cut strips from the rollers and selectively depositing the strips in predetermined spaced relation, means for pivoting said distributor about said receiving end into successive selected positions in timed relation with the movement of the pivoting rollers, and dams positioned within the space between the coacting kneading rollers to prevent axial extrusion of the dough bars while being kneaded.

7. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through a nip of said drums, means for actuating the cutter in timed relation to the rate of feed of the dough sheet, a plurality of rollers contiguous to the cutter for rolling and kneading the cut strips into cylindrical bars, at least one of said rollers capable of pivotal movement with respect to the other rollers, means for pivoting said last named roller in timed relation with the cutter, a distributor having a receiving end mounted beneath said rollers for receiving the cut strips from the rollers and selectively depositing the strips in predetermined spaced relation, means for pivoting said distributor about said receiving end into successive selected positions in timed relation with the movement of the pivoting roller, means for rotating said rums in the operation of said machine, and means for quickly reversing the direction of rotation of the drums for removal of dough from the machine.

8. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through the nip of said drums, means for actuating the cutter in timed relation to the rate of feed of the dough sheet, a plurality of rollers contiguous to the cutter for rolling and kneading the cut strips into cylindrical bars, at least one of said rollers capable of pivotal movement with respect to the other rollers, means for pivoting said last named roller in timed relation with the cutter, a distributor having a receiving end mounted beneath said rollers for receiving the cut strips from the rollers and selectively depositing the strips in predetermined spaced relation, means for pivoting said distributor about said receiving end into successive selected positions in timed relation with the movement of the pivoting roller, a driving motor for said machine, driving connections between said motor and said drums, cutter and kneading rollers, and means including a variable speed pulley for adjusting the relative speeds of said drums, cutter and rollers.

9. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through the nip of said drums, means for actuating the cutter in timed relation to the rate of feed of the dough sheet, a plurality of rollers contiguous to the cutter for rolling and kneading the cut strips into cylindrical bars, at least one of said rollers capable of pivotal movement with respect to the other rollers, means for pivoting said last named roller in timed relation with the cutter, a distributor for receiving the cut strips from the rollers and selectively depositing the strips in predetermined spaced relation, means for pivoting said distributor in timed relation with the movement of the pivoting roller, a trough positioned between the rollers and the distributor, a pivoting side for said trough, and means controlled by the distributor for actuating the pivoting side of the trough in accordance with the position of the distributor.

10. In a dough machine, a pair of horizontally journaled drums having cooperating peripheries in predetermined spaced relation providing a nip through which dough may be fed to form a dough sheet, a cutter contiguous to the drums for severing strips of dough from the sheet after passing through the nip of said drums, means for actuating the cutter in timed relation to the rate of feed of the dough sheet, a plurality of rollers contiguous to the cutter for rolling and kneading the cut strips into cylindrical bars, at least one of said rollers capable of pivotal movement with respect to the other rollers, means for pivoting said last named roller in timed relation with the cutter, a distributor having a receiving end mounted beneath said rollers for receiving the cut strips from the rollers and selectively depositing the strips in predetermined spaced relation, and means for pivoting said distributor about said receiving end into successive selected positions in timed relation with the movement of the pivoting roller, the distributor comprising an elongated chute pivotally mounted to receive dough bars kneaded by the rollers, and means including an extension on the distributor for intercepting dough bars and guiding them into the distributor when the distributor is pivoted to predetermined distributing positions.

11. In a dough handling machine, the combination comprising a plurality of kneading rollers, means to feed successive dough strips to said kneading rollers, means for moving at least one of said kneading rollers relatively to others thereof, successively into a position in which it coacts with the other kneading rollers to knead the strip and into a position spaced from the other rollers to permit removal of the strip, a distributor for receiving the kneaded strips successively from said kneading rollers, means for moving said distributor in timed relation with said movable kneading roller, a rack comprising a plurality of slats between which individual bars are deposited, an endless conveyor beneath said rack, and offset termini on said slats to straighten the bars of dough as they are fed by said endless conveyor through and from said rack after deposit through said rack upon said conveyor.

12. In a dough handling machine, the combination comprising means for kneading successively fed dough strips to form bars, a travelling conveyor, a slatted guide overlying said conveyor, means for depositing kneaded dough bars between the slats of said guide into laterally spaced positions extending longitudinally of said conveyor, and means for straightening said dough bars as they are fed forwardly by said conveyor from their deposited positions.

13. In a dough handling machine, the combination comprising means for kneading successively fed dough strips to form bars, a travelling conveyor, a slatted guide overlying said conveyor, means for depositing kneaded dough bars between the slats of said guide into laterally spaced positions extending longitudinally of said conveyor, and means on said slats for straightening said dough bars as they are fed forwardly by said conveyor from their deposited positions.

14. In a dough handling machine, the combination comprising means for kneading successively fed dough strips to form bars, a travelling conveyor, a slatted guide overlying said conveyor, means for depositing kneaded dough bars between the slats of said guide into laterally spaced positions extending longitudinally of said conveyor, and grooved rollers overlying the paths of said dough bars as deposited on said conveyor and fed forwardly thereby for straightening said dough bars as they are fed forwardly by said conveyor from their deposited positions.

15. In a dough handling machine, the combination comprising timed means for kneading dough strips to form bars and discharge them in timed sequence from the kneading operation, a distributor for receiving the kneaded bars successively from the kneading operation, means for moving said distributor successively to a plurality of selected positions in timed relation to discharge of said bars from the kneading operation, and an extension movable with said distributor into position for intercepting dough bars from said kneading means and guiding them into the distributor when the distributor is moved to predetermined distributing position.

16. In a dough handling machine, the combination comprising timed means for kneading dough strips to form bars and discharge them in timed sequence from the kneading operation, a distributor for receiving the kneaded bars successively from the kneading operation, means for moving said distributor in timed relation to discharge of said bars from the kneading operation to distribute the same, a trough positioned between said kneading means and said distributor for transfer of said bars from the kneading means to the distributor, a pivoting side for said trough, and means controlled by movement of the distributor for actuating the pivoting side of the trough to discharge dough bars therefrom into said distributor in accordance with the position of the distributor.

17. In a dough handling machine, the combination comprising a plurality of rollers adapted to receive a strip of dough and knead the same into the form of a cylindrical bar, means for moving at least one of said rollers bodily with respect to other of said rollers to form a space defined between at least three rollers within which the strip is kneaded to form the dough bar, dams positioned within the space between the coacting, kneading rollers when in kneading positions wherein the strip is kneaded, whereby to prevent axial extrusion of the dough bars while being kneaded, and means to urge at least one of said dams resiliently toward the other in an axial direction in the space between said rollers.

References Cited in the file of this patent
UNITED STATES PATENTS

| | | |
|---|---|---|
| 534,071 | Mitchell | Feb. 12, 1895 |
| 614,423 | Dobson | Nov. 15, 1898 |
| 638,090 | Bryce | Nov. 28, 1899 |
| 719,116 | Hueg | Jan. 27, 1903 |
| 1,126,606 | Wolf | Jan. 26, 1915 |
| 1,178,674 | Pletscher | Apr. 11, 1916 |
| 1,252,822 | Lorioli | Jan. 8, 1918 |
| 1,304,104 | Schiller | May 20, 1919 |
| 1,595,019 | Moores | Aug. 3, 1926 |
| 1,701,850 | Holtzman | Feb. 12, 1929 |
| 1,755,921 | Gendler | Apr. 22, 1930 |
| 2,026,526 | Gipe | Jan. 7, 1936 |
| 2,031,365 | Gerland | Feb. 18, 1936 |
| 2,090,291 | Gipe | Aug. 17, 1937 |
| 2,382,657 | Olgiati | Aug. 14, 1945 |
| 2,408,729 | Brackett | Oct. 8, 1946 |
| 2,451,104 | Lowe | Oct. 12, 1948 |
| 2,517,983 | Crosland | Aug. 8, 1950 |
| 2,573,754 | Young et al. | Nov. 6, 1951 |
| 2,596,228 | Fletcher | May 13, 1952 |
| 2,608,939 | Naylor | Sept. 2, 1952 |
| 2,693,154 | Appleton | Nov. 2, 1954 |